United States Patent
Heeb

(10) Patent No.: US 7,292,171 B2
(45) Date of Patent: Nov. 6, 2007

(54) METHOD AND DEVICE FOR THE VERSION OF DIGITAL SIGNALS WITH HETEROGENEOUS FORMATS AND APPLICATION THEREOF TO THE DIGITAL AMPLIFICATION OF AUDIO SIGNALS

(75) Inventor: Thierry Heeb, Fey (CH)

(73) Assignee: Anagram Technologies SA, Preverenges (CH)

( * ) Notice: Subject to any disclaimer, the term of this patent is extended or adjusted under 35 U.S.C. 154(b) by 0 days.

(21) Appl. No.: 10/588,644

(22) PCT Filed: Feb. 2, 2005

(86) PCT No.: PCT/EP2005/050462

§ 371 (c)(1),
(2), (4) Date: Aug. 4, 2006

(87) PCT Pub. No.: WO2005/086161

PCT Pub. Date: Sep. 15, 2005

(65) Prior Publication Data

US 2007/0194961 A1    Aug. 23, 2007

(30) Foreign Application Priority Data

Feb. 6, 2004    (FR) .................................. 04 50224

(51) Int. Cl.
*H03M 3/00*    (2006.01)

(52) U.S. Cl. ...................... 341/143; 341/144; 341/152; 330/10; 330/251; 375/238; 375/242; 375/247

(58) Field of Classification Search .................. 341/143
See application file for complete search history.

(56) References Cited

U.S. PATENT DOCUMENTS

| 5,675,590 | A | 10/1997 | Alamouti et al. | |
| 6,473,457 | B1 * | 10/2002 | Pascual et al. | ............... 375/238 |
| 6,606,044 | B2 * | 8/2003 | Roeckner et al. | ........... 341/143 |
| 7,224,728 | B2 * | 5/2007 | Komamura | .................. 375/238 |
| 2002/0154247 | A1 | 10/2002 | Ghosh et al. | |
| 2003/0122692 | A1 | 7/2003 | Roeckner et al. | |

FOREIGN PATENT DOCUMENTS

WO    WO-03/100983 A    12/2003

OTHER PUBLICATIONS

A. C. Floros et al., "A novel and efficient PCM to PWM converter for digital audio amplifiers," Electornics, Circuits and Systems, 1999 Proceedings of ICECS '99. The 6th IEEE International Conference on Paros, Cyprus Sep. 5-8, 1999, Piscataway, NJ, USA, IEEE, US, vol. 1, Sep. 5, 1999, pp. 165-168.

* cited by examiner

*Primary Examiner*—Khai M. Nguyen
(74) *Attorney, Agent, or Firm*—Fulbright & Jaworski LLP

(57) ABSTRACT

The invention relates to a method and device for the conversion of digital signals comprising a phase involving modulation with the aid of a vector lattice encoder. The inventive method comprises iterative steps which are performed on N output candidates, consisting in filtering (Hx, Hq), determining the difference between the filtered signals calculating two possible evolutions for said options, preselecting the candidates that minimise the difference, weighting the difference with a cost function (W), marking the candidates eliminated for a subsequent iteration, and selecting the best candidate over a period determined by a historical decision dimension. The invention also relates to the use thereof in relation to a digital audio signal amplifier.

17 Claims, 6 Drawing Sheets

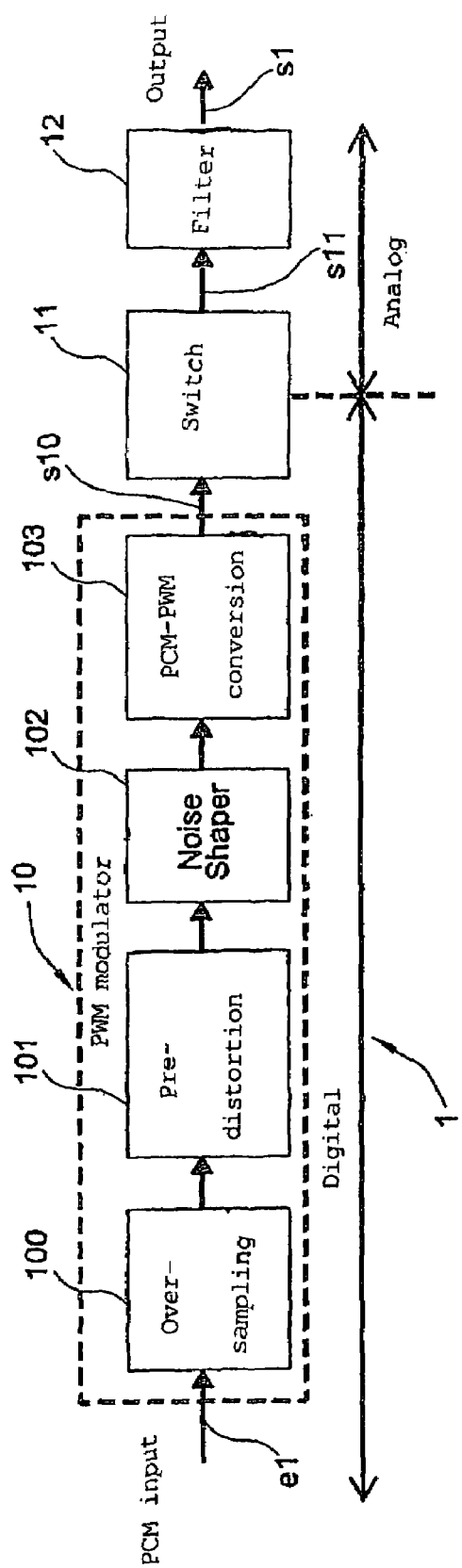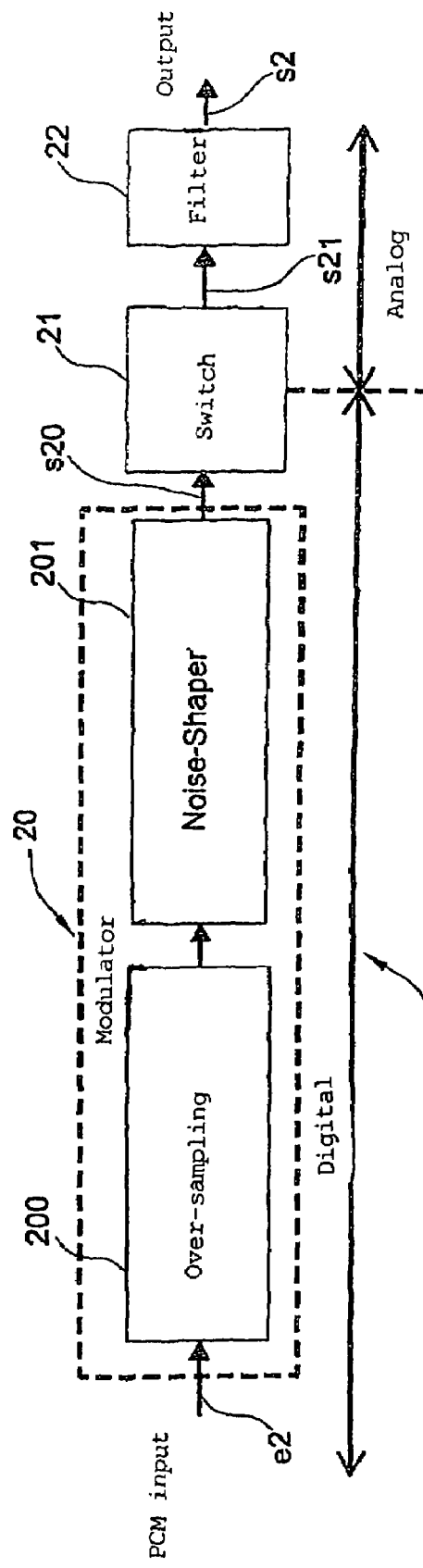

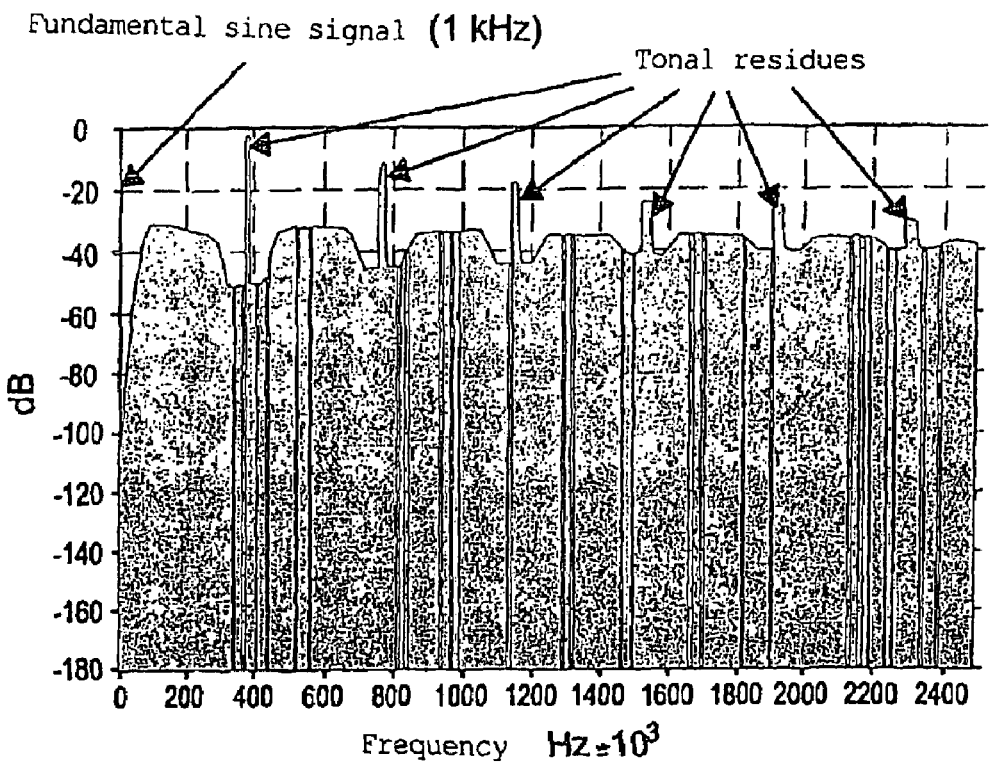
FIG.3 PWM Modulation  Prior Art
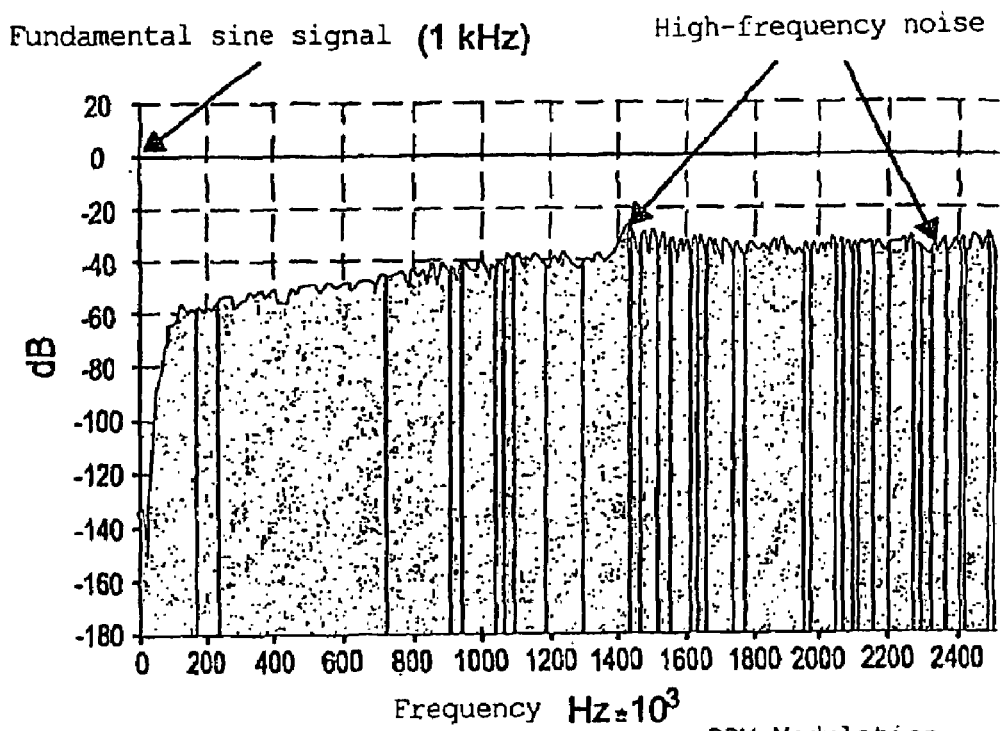
FIG.4 PDM Modulation  Prior Art

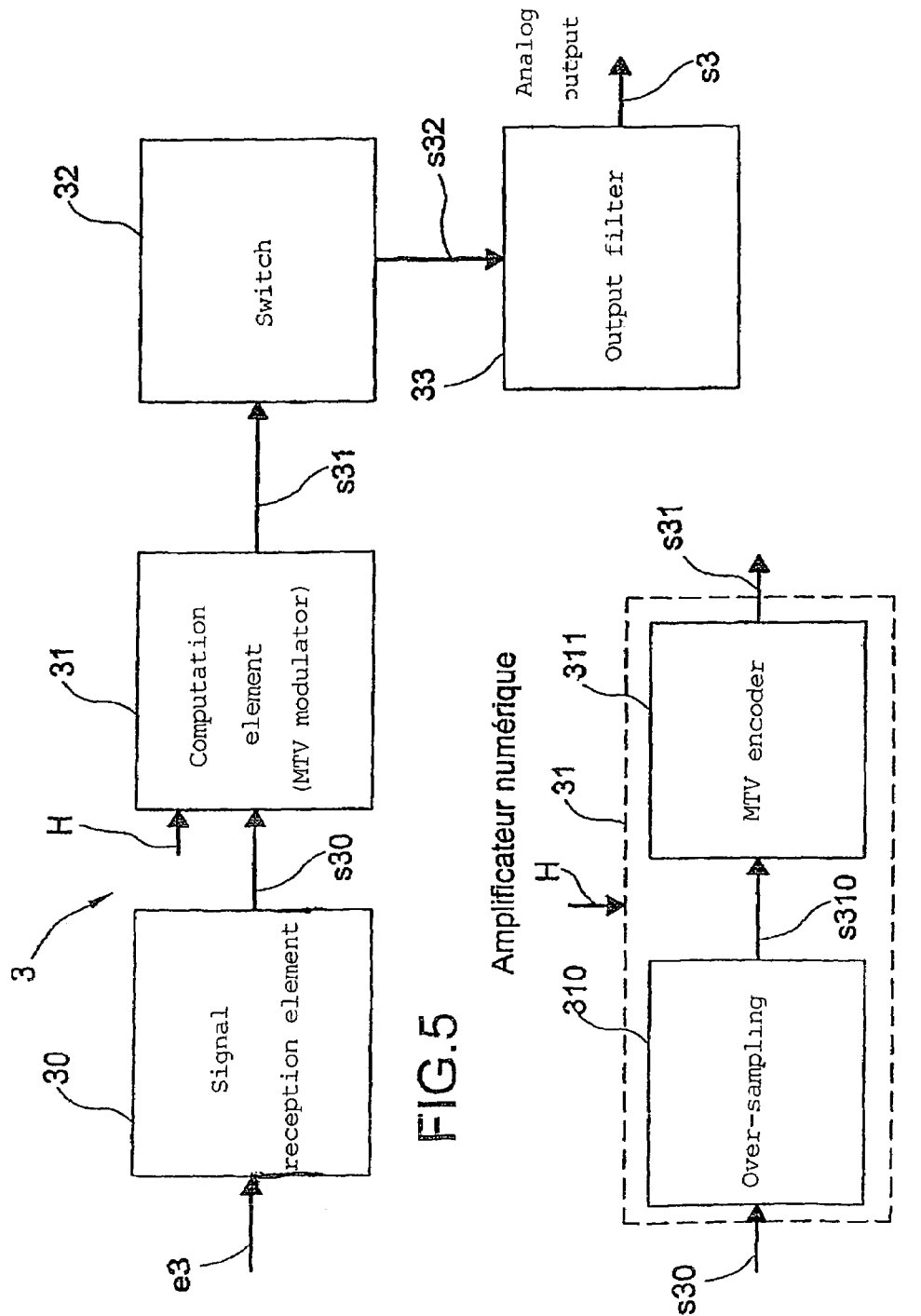

Frequency spectrum of a digital amplifier with VTM modulation (mode A)

Frequency spectrum of a digital amplifier with VTM modulation (mode B)

METHOD AND DEVICE FOR THE VERSION OF DIGITAL SIGNALS WITH HETEROGENEOUS FORMATS AND APPLICATION THEREOF TO THE DIGITAL AMPLIFICATION OF AUDIO SIGNALS

RELATED APPLICATION

This application claims priority from international application no. PCT/EP2005/050462 filed Feb. 2, 2005 and French application no. 04/50224 filed Feb. 6, 2004, both incorporated by reference in their entireties.

FIELD OF THE INVENTION

The invention relates to a method for the conversion of digital signals having heterogeneous formats. It also relates to a device for the implementation of such a method. It can be applied especially, though not exclusively, to the digital amplification of audio signals. Indeed, it can also be applied in many other fields, for example encoding known as DSD (direct stream digital) encoding. This is a new encoding format developed by the firms Sony and Philips (both registered marks) and used especially for super audio CD. Again in a non-exhaustive fashion, the method of the invention can also be implemented for the control of engines.

Here below, these and other abbreviations shall be used for the purpose of simplifying the description. These abbreviations and their meaning are given together in Table 1, placed at the end of the present description, and shall be referred to as need be.

To provide a clear idea, and without in any way thereby limiting the scope of the invention, the following description is situated in the case of the preferred application of the invention, namely the digital amplification of audio signals.

For the amplification audio signals, as in other features, the general trend is to replace analog methods by methods resorting to digital techniques. For example, we may cite the replacement of the disk known as the vinyl disk by the audio CD.

However, the digital signals exist in a variety of formats and it is often necessary to be able to go from one to the other. This conversion is one of the aims that the present invention sets for itself.

More particularly, it relates to the function known as the modulation function implemented in the digital amplification methods.

More specifically, the digital amplification can be distinguished from classic (analog) linear amplification essentially by the fact that the output stage of the amplifier, or power stage, works not in linear mode but in switching mode, namely in "all or nothing" mode. The output stages of the digital amplifiers generally have two [+1 and −1] or three [+1, 0, −1] logic states. For a clear picture, here below, the case involving three logic states shall be discussed.

BACKGROUND OF THE INVENTION

Digital amplification, by virtue of its architecture and its mode of operation, brings undeniable advantages as compared with classic analog amplification. The main advantage is its high efficiency; the heat released by a digital amplifier is minimal, enabling far more compact and hence more advantageous construction.

Another advantage of digital amplification is its appropriateness in the use of input digital signals, which naturally prevents resorting to a digital-analog conversion stage known as a "low-level" stage.

Methods and devices have therefore been proposed in the prior art, enabling this digital amplification. More specifically, two main types of digital amplifiers have been proposed, each resorting to a particular modulation method, namely respectively the types of modulation known as PWM and PDM modulation (see Table 1).

PWM-type amplifiers are the most widely used category. They generate pulses whose duration is modulated by a signal to be reproduced. FIG. 1, placed at the end of the present description, represents a simplified exemplary drawing of a standard PWM amplifier referenced 1.

The amplifier 1 comprises a modulator stage 10 proper, of the above-mentioned PWM type. This modulator 10 itself has the following elements in a cascade connection: an over-sampling circuit, typically x8, a circuit known as a pre-distortion circuit 101, a circuit called a noise shaper 102, and a PCM-PWM type conversion circuit 103. The input $e_1$ of the PWM modulated 10 receives a PCM-encoded digital signal. These circuits are the digital part proper of the amplifier 1.

The output $s_{10}$ of the modulator 10 is transmitted to a switching stage 11, forming a boundary between the digital and analog paths of the amplifier 1.

The signal, which is henceforth an analog signal, present at the output $s_{11}$ of the switching stage 11 is filtered by an output filter 12 before being transmitted to use circuits (not shown) through the general output of the amplifier $s_1$.

More specifically, the switching stage 11 may be a two-level or three-level or logic-state switching stage, this depending on the precise configuration of the modulator 10. It is generally implemented in the form of an H bridge or H semi-bridge, made as an integrated circuit or in the form of discrete components.

The output filter 12 is a low-pass filter, typically a second-order or fourth-order filter. It is designed to eliminate the switching noises from the output signal The pre-distortion module 101 is used to counter-balance the distortion introduced by the PCM-PWM converter 103, generally known as the U.PWM type converter.

The working and characteristics, in more precise detail, of an amplifier implementing PWM technology are well known to those skilled in the art, and it is unnecessary to describe them any further.

The main disadvantage of PWM digital amplifiers is related to the production of high-frequency residues known as tonal residues which furthermore are of high amplitude. This dysfunction is due to the repetitive cycle of the PWM approach. These residues pose problems in terms of electromagnetic compatibility for certain environments in which they are used, especially for automobile-related applications.

By way of an example, FIG. 2, placed at the end of the present description, represents a frequency spectrum, ranging between 0 and 2.5 MHz, resulting from a typical implementation of the PWM amplifier of FIG. 1, when it is supplied with a high-amplitude 1 kHz sine signal. In particular, major tonal residues are seen to appear at a level close to the fundamental frequency. These residues could present problems of electromagnetic compatibility.

FIG. 3, placed at the end of the present description, is an example of a simplified drawing of a standard PDM amplifier, referenced 2.

The PDM type amplifiers have been the subject of numerous theoretical studies but there are only a few apparatuses on the market implementing this technology, all of them produced by the firm Sharp (registered mark). These amplifiers rely on the same encoding method as the SACD amplifiers (see Table 1), this method being called the DSD method (see Table 1).

The general architecture of the amplifier is similar to that of the amplifier 1 of FIG. 1: a modulator 20, receiving a PCM-format digital signal at its input $e_2$, a switching stage 21 receiving the signal present at the output $s_{20}$ of the modulator 20 and an output filter 21 receiving the signal present at the output $s_{21}$ of the selector switch 21. The signal delivered at the general output $s_2$ of the digital amplifier 2 is transmitted, as here above, to use circuits (not shown).

The basic difference between the two amplifiers of FIG. 1 and 2 lies in the nature of the modulator, namely a PDM type modulator 20 in the present case, comprising, in a cascade connection, an over-sampling circuit 200, typically x64 or x128, and a circuit known as a noise shaper circuit 201, which is typically a seventh-order circuit.

Again as here above, the switching stage 21 may be a two-level or a three-level stage, depending on the precise modulator implemented. It is generally implemented in the form of an H bridge or H semi-bridge, made as an integrated circuit or in the form of discrete components. The output filter 22 is no pass filter, typically a second-order or fourth-order filter, a low-pass filter designed to eliminate the switching noises from the output signal delivered on the general output $s_{21}$.

The working and characteristics, in more precise detail, of an amplifier implementing PWM technology are well known to those skilled in the art, and it is unnecessary to describe them any further.

Although they do not have significant tonal characteristics, the high frequency residues prompted by this type of digital amplifier are very great and are endowed with high energy. This characteristic raises no problems as regards low-level conversions may but, on the contrary, represent a technological challenge for higher power values, generating an additional cost. Indeed, the high switching frequency of the output stage may be detrimental to the efficiency of the amplifier.

FIG. 4, placed at the end of the present description, represents the frequency spectrum, ranging between 0 and 2.5 MHz, resulting from a typical implementation of the PDM amplifier 2 when it is supplied with a simple, high-amplitude sine signal. It can be seen in particular that the noise level which is elevated in terms of high frequency, bears witness to a high switching frequency of the output stage.

Despite the theoretical interest represented by the use of the digital methods of the above description, it can be seen that digital amplifier implementations with digital inputs, compliant with the prior art, continue to present drawbacks which may rule out the use of the devices in certain fields of application.

OBJECTS AND SUMMARY OF THE INVENTION

The invention seeks to overcome the drawbacks of the prior art methods and devices, some of which have just been recalled.

Indeed, the method according to the invention enables the elimination of the major tonal residues presented by the PWM modulation at the same time as the reduction of the mean switching frequency of the output stage, and consequently permits greater energy efficiency, thus making for a significant improvement over the PDM modulation which requires high frequency.

The invention is designed to provide a method of digital conversion of signals with heterogeneous format, especially but not exclusively applied to the making of an audio signal digital amplifier.

The invention more particularly relates to the modulation method implemented to make the above-mentioned conversion.

To do so, according to a first major characteristic, the method of the invention implements a modulation called a vector lattice modulation, which shall be described in greater detail and more precisely here below, and which takes the form of two preferred modes.

The method of the invention has many advantages which shall be highlighted in the following the detailed description. These are especially the following:

the disappearance of the high-frequency, high-energy tonal residues and reduction of high-frequency noise level;

the absence of high-energy tonal residues providing for improved electromagnetic compatibility;

a significant lowering of the general level of modulation noise, especially in the upper parts of the spectrum, and concentration of the modulation noises in the lower part of the spectrum, typically around 700 Hz;

concentration at low frequency, typically around 700 kHz, of the modulation noises, implying that the mean switching frequency of the output stage is kept at a reasonable level and thus enables high efficiency for the system; and maximum noise level reduced relative to the two classic types of implementation.

Furthermore, a device implementing the method according to the invention preserves a general architecture similar to that of the prior art device as described with referenced FIGS. 1 and 3, which is an additional advantage since only the modulation part is specific to the invention.

The main object of the invention therefore is a method for the conversion of signals called input digital signals, comprising a phase for the modulation of said input signals; characterized in the said modulation is performed by the implementation of a vector lattice encoder and in that said method comprises the following encoding steps:

a preliminary step consisting of the choice of three parameters respectively representing a determined number N of distinct variables associated with said input signals known as output candidates, a determined number K of possible temporal developments of said candidates, and a Kth temporal variable T, called historical decision depth determining a maximum number of iterations before the generation of a result;

a first step for the filtering of said input signals so as to generate first filtered signals;

a second step for the filtering of signals representing candidates so as to generate second filtered signals representing filtered candidates;

a third step in which the difference is taken between the said first and second filtered signals;

a fourth step consisting of the pre-selection, by means of a pre-selection element, for each of said N candidates, of the first to the Kth modified candidates representing said K possible developments and each meeting a first predetermined criterion, said first candidate being the one that minimizes said difference;

a fifth step consisting of the weighting of said difference by means of a function called a cost function classifying said K developments so as to mark the candidates designed to be eliminated or kept for a subsequent iteration of the steps of said method, and of the transmitting of said modified candidates to a selection element;

a sixth step consisting of the selection of the best candidate by said selection element by comparison with a second predetermined criterion minimizing said cost function;

a seventh step consisting of iterations from the first to sixth steps until said historical decision depth T is attained; and an eighth step consisting of choosing the best candidate at the end of said seventh step.

An object of the invention is also a device for the implementation of the method.

Yet another object of the invention is the application of the method to the making of an audio signal digital amplifier.

BRIEF DESCRIPTION OF THE FIGURES

The invention shall be described in greater detail with reference to the appended drawings, of which:

FIG. 1 is a schematic illustration of an exemplary simplified scheme of a prior art PWM-type-modulated amplifier;

FIG. 2 shows a frequency spectrum of an amplifier of the type shown in FIG. 1;

FIG. 3 shows an example of a simplified scheme of a prior art PDM-type-modulated amplifier;

FIG. 4 shows a frequency spectrum of an amplifier of the type shown in FIG. 3;

FIG. 5 is a schematic illustration of an exemplary architecture of the digital amplifier implementing the method according to the invention;

FIG. 6 is a block diagram of the circuits of the modulator of the amplifier of FIG. 5, according to a preferred embodiment of the invention;

DETAILED DESCRIPTION OF THE INVENTION

Figure 6A:
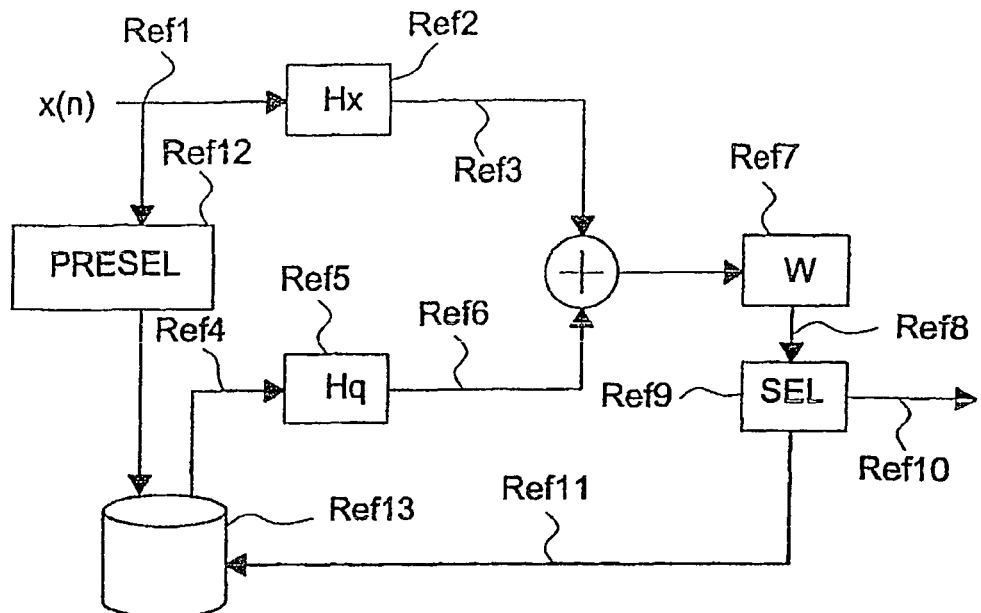
FIG. 6A is a logic block diagram schematically illustrating the main steps of a vector lattice modulation algorithm according to the invention.

Here below, and without its scope being thereby limited in any way, the context, unless otherwise stated, shall be that of a preferred application of the invention, i.e., that of a digital amplifier with reference to FIGS. 5 to 9.

Furthermore, as stated here above, the invention relates more particularly to the "modulation" function. Hence the other functions and/or circuits are described only as needed, as they are well known to those skilled in the art.

Similarly, in the following figures, the common elements bear the same references and shall not be re-described except as needed.

FIG. 5 provides a schematic illustration of the architecture of a digital amplifier, henceforth referenced 3, for the implementation of the method according to the invention.

As stated, this architecture is very similar to that of the digital amplifiers of FIGS. 1 and 2. The digital amplifier 3 comprises the following elements in a cascade connection: a digital signal reception element 30, in the PCM format, present at the input $e_3$, a modulator 31 receiving the signals generated at the output of the element 30 and generating a logic switching signal at its output $s_{31}$, a switching stage 32 receiving this signal, itself generating a power switching signal at its output $s_{32}$, and an output filter 23 delivering, at the general output $s_{31}$ of the amplifier 3, a signal transmitted to use circuits (not shown).

It must be noted that the modulator 31 also receives clock signals H necessary for the setting of its pace.

In accordance with one of the major characteristics of the invention, the modulator 31 is constituted by a computation element implementing an MTV algorithm (see TABLE I). This computation element 31 can be made in various ways, especially on the basis of an standard stored-program automatic data-processing system, for example a microprocessor associated with memory circuits and other standard circuits, a digital signal processor or DSP (see table 1), a dedicated integrated circuit, an FPAG (see TABLE I) or again a subset of a "Soc" (see TABLE I).

In a preferred embodiment described here below, three switching levels will be chosen. They shall arbitrarily be called: −1, 0 and +1.

The output filter is preferably of the second or fourth order.

As stated, the modulator 31 can be made according to two preferred embodiment which here below shall be arbitrarily called "mode A" and "mode B" respectively.

FIG. 6 is a block diagram of the circuits of the modulator 31. This modulator comprises and over-sampling circuit 310 and the MTV encoding circuit 311 proper, receiving at its input the signals present at the output $s_{310}$ of the over-sampler 310.

The signal delivered at the output $s_{31}$ of the modulator 31 (i.e. the MTV encoder 311) is, in the present assumption, a signal with three levels and two logic lines.

In the two preferred modes of implementation of the modulator 31, i.e. the above-mentioned modes "A" and "B", the over-sampler 310 may be identical. Only the encoder 311 is specific by the algorithm implemented to obtain the "MTV" encoding.

The over-sampler 310 is used to raise the frequency of sampling of the PCM signal present at the input $e_3$ in order to obtain disturbance-free modulation in the audio frequency band. It can be made by means of the technique known as the zero-pad technique which is a method of truncation of a matrix followed by a simple linear filtering, for example of the "FIR" or "IIR" type (see TABLE I).

Advantageously, the over-sampling is done with a factor 128.

The MTV encoder 311, for its part, implements the modulation algorithm proper. A more detailed description shall now be given of the preferred mode of implementation of the modulator in mode A, with reference to FIG. 6A which represents a logic block diagram providing a schematic illustration of the main steps of a vector lattice modulation algorithm.

Here below, the following notations will be used:

N is a number that represents a variable which shall be called "number of output candidates", with N=8 in the example described;

K is a number representing a variable which shall be called "number of possible developments per output candidates", with K=2 in the example described; and T is a number representing a variable which shall be called "historical decision depth>> with T=2 in the example described.

The following terms will also be applied:
"Filter Hq" a fifth order low-pass filter, advantageously of the Chebychev II type with optimized zeros; and
"Filter Hx" a fifth order low-pass filter, advantageously of the Chebychev II type with optimized zeros.

It must also be clear however that the chosen values may differ from the above values. However experience shows that these values represent an efficient compromise between computation power necessary to carry out vector lattice encoding and performance values attained.

In FIG. 6A, the following references are used and represent:

$Ref_1$: input signal x(n), n being an instantaneous time;
$Ref_2$: filter Hx of the input signal (n);
$Ref_3$: input signal Hx(n) filtered by Hx;
$Ref_4$: instantaneous value q(n) of one of the N output candidates at the time n;
$Ref_5$: filter Hq of the candidate values at output;
$Ref_6$: candidate signal Hq(n) filtered by Hq;
$Ref_7$: function W of weighting of the error between the input and the candidate;
$ref_8$: error signal e(n) weighted between the input and the candidate;
$Ref_9$: selection block SEL for selection of the optimum candidate at the time n;
$Ref_{10}$: optimum output signal y(n)=q(n–T), T being a predetermined period of time;
$Ref_{11}$: signal Sel(n) for invalidation of all the candidates for the instant n+1 not corresponding to the ideal candidate at that time (n–T);
$Ref_{12}$: function of pre-selection PRESEL of the possible developments of candidates as a function of the input signal; and
$Ref_{13}$: signal Pev(n) for pre-selection of possible developments.

There are N output candidates at the instant n.

The five main steps, which are sequential or simultaneous, of the encoding method according to "mode A" of the invention are done iteratively as indicated here below. The letter "A" attached to the number of the step characterizes the "mode A".

Step 1A: At the instant n, the operation starts by computation of the output of the filter Hx, $Ref_2$, from the input signal x(n), $Ref_1$, to generate the signal Hx(n), $Ref_3$.

Step 2A: At the same time, using the pre-selection function PRESEL, $Ref_{12}$, the following are selected as possible developments for each of the N candidates:

(a) the candidate whose output [q(n)] minimizes the difference with the signal formed by the difference between the signals Hx(n), $ref_3$, and Hq(n), $ref_6$, and (b) the candidate keeping the same output state as at the previous turn.

For each of the N candidates, the options (a) and (b) represent the K possible developments (K=2 in the example chosen). It must be noted that, in certain cases, the options (a) and (b) may be identical.

Step 3A: the difference between the input signal Hx(n), $Ref_3$, and the candidate signal Hq(n), $Ref_6$, is then passed on to the weighting function W or function known as a cost function, $Ref_7$. This cost function W is used to classify possible developments so that it is possible to choose the survivors from the next turn.

In this implementation (mode A), the cost function W is as follows: if the options (a) and (b) for a given candidate have different signs and both are non zero, then the option (b) cannot survive. If the amplitude of the difference between the signals (Hx(n)–Hq(n)) is greater than a predetermined threshold, the option (b) cannot survive. If the amplitude of the above-mentioned difference (Hx(n)–Hq(n)) is below this threshold and if a counter (not shown) of a number of also predetermined transitions allows it, the option (a) cannot survive; if not, the option (b) cannot survive. The transition counter is of the "up-down" type, increasing its content by a value "1" (unity) whenever the option (b) is followed rather than the option (a) and the option (b) is greater than (a) and being diminished by "1" whenever the option (b) is followed rather than the option (a) and the option (b) is smaller than (a). The transition counter enables a transition, i.e. the choice of the option (b) inasmuch as its absolute value is smaller than or equal to the number 2.

Step 4A: the result of the step 3A with the options that cannot survive being marked as such, i.e. the error signal e(n), $Ref_8$, is passed on to the selection block SEL for the selection of the best candidate $Ref_9$. This block will choose, as its best candidate, the candidate minimizing the difference in energy between the signals e(n) and the optimum output signal y(n)=q(n–T) over a period (n–T, n). f(n, k) designates the signal e(n) at the instant n for a candidate k and q(n,k) designates the signal y(n) at the time n for the same candidate. The block SEL will choose the candidate whose survival is permitted by the function W and minimizes the expression E(n, k) meeting the following relationship.

$$E(n,k)=(f(n-T,k)-q(n-T,k))\hat{2}+(f(n-T+1,k)-q(n-T,k))\hat{2}+\ldots+(f(n,k)-q(n,k))\hat{2}$$

Step 5A: the best candidate being determined, the survivors at the instant n+1 are then determined by all the candidates and their developments with output at the time n–T equal to q(n–T).

It can be seen that the method consists of a search in a binary tree: at each step, there are two options of development r(a) and (b) which have been defined here above, hence a sequence of dichotomic choices. Thus, a decision on an ideal candidate at the instant n determines one branch (a) of the tree, i.e. the branch containing the ideal candidate and, therefore, the survivors for the next turn, i.e. all the elements of the above-mentioned branch.

Figure 7:
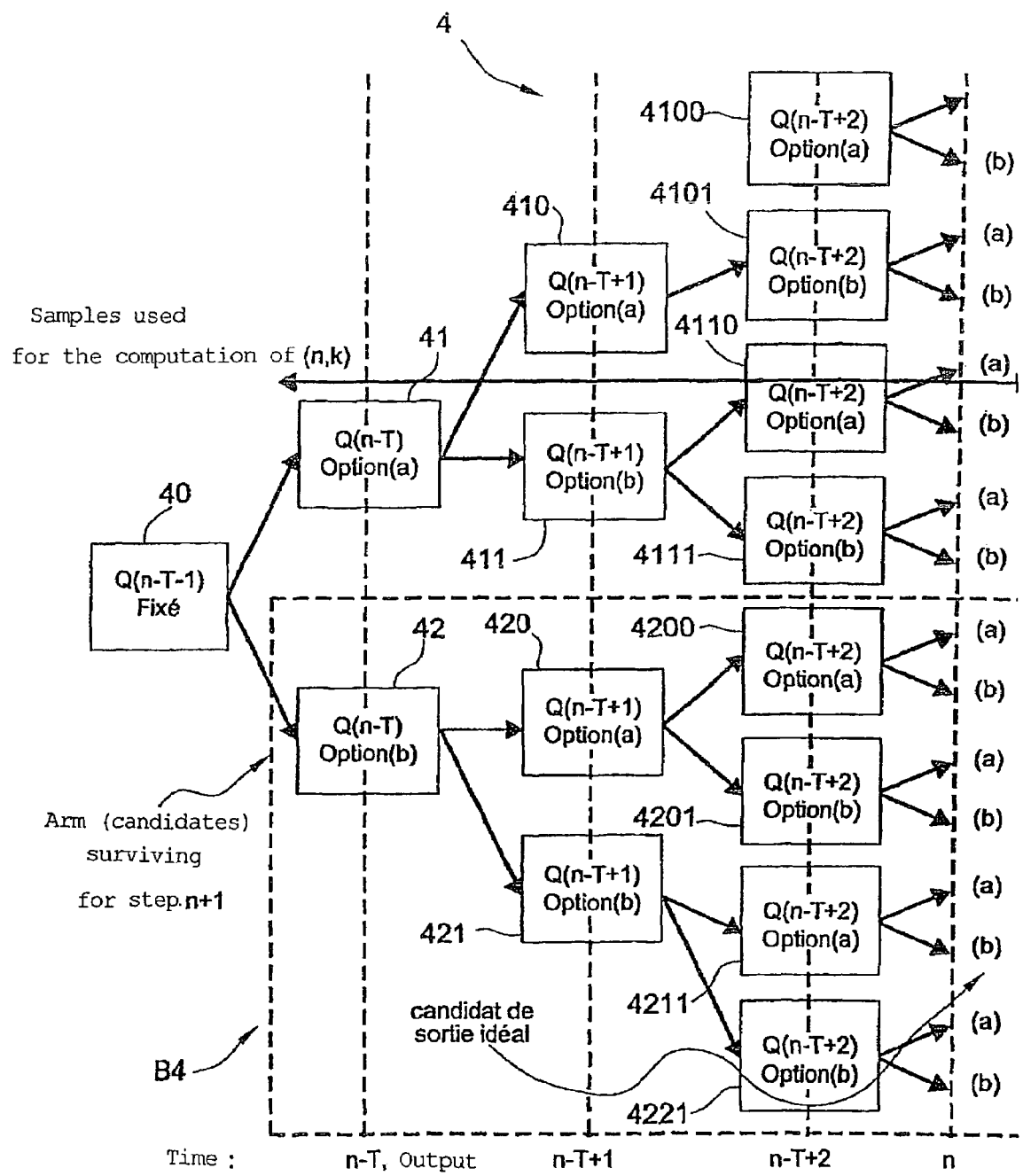
FIG. 7 is a binary tree illustrating the steps of the algorithm of FIG. 6A.

The diagram of FIG. 7 provides a schematic illustration of a binary tree of this kind, with the general reference 4. The x-axis, corresponding to the times, shows the instants, n–T, n–T+1, n–T+2 and n. The blocks of the tree 4 shown in FIG. 7 represent samples used for the computation of the function E(n, k).

The first block, referenced 40 contains a fixed sample Q(n–T–1) and its two outputs, the options or branches (a) and (b), transmitted to the respective blocks 41 and 42: the samples Q(n–T), options (a) and (b).

The respective output of these two blocks, 41 and 42, are transmitted in turn to the four blocks 410 to 421: the samples Q(n–T+1), option (a) for the blocks 410 and 420, respectively, and option (b) for the blocks 411 and 421, respectively.

The process is repeated for the instant n–T+2. The eight blocks 4100 to 4221 receive the outputs from the four preceding blocks, options (a) for the even-numbered blocks (for example 4100) and options (b) for the odd-numbered blocks (for example 4101). At the n, there are therefore eight candidates (N=8 in the example described, as indicated).

The lower branch (block shown in dashes in FIG. 7, referenced $B_4$) group together the surviving candidates for the step n+1.

In the implementation of the method of the invention according to the mode A which is just been described, whenever an option (b) is chosen at the instant n–T, the output of the system (q(n–T)) remains constant, thus reducing the number of state transitions of the output stage of the system. It follows, correlatively, that the switching frequency of the output stage is lowered, thus enabling an increase in the efficiency of the system.

Figure 8:
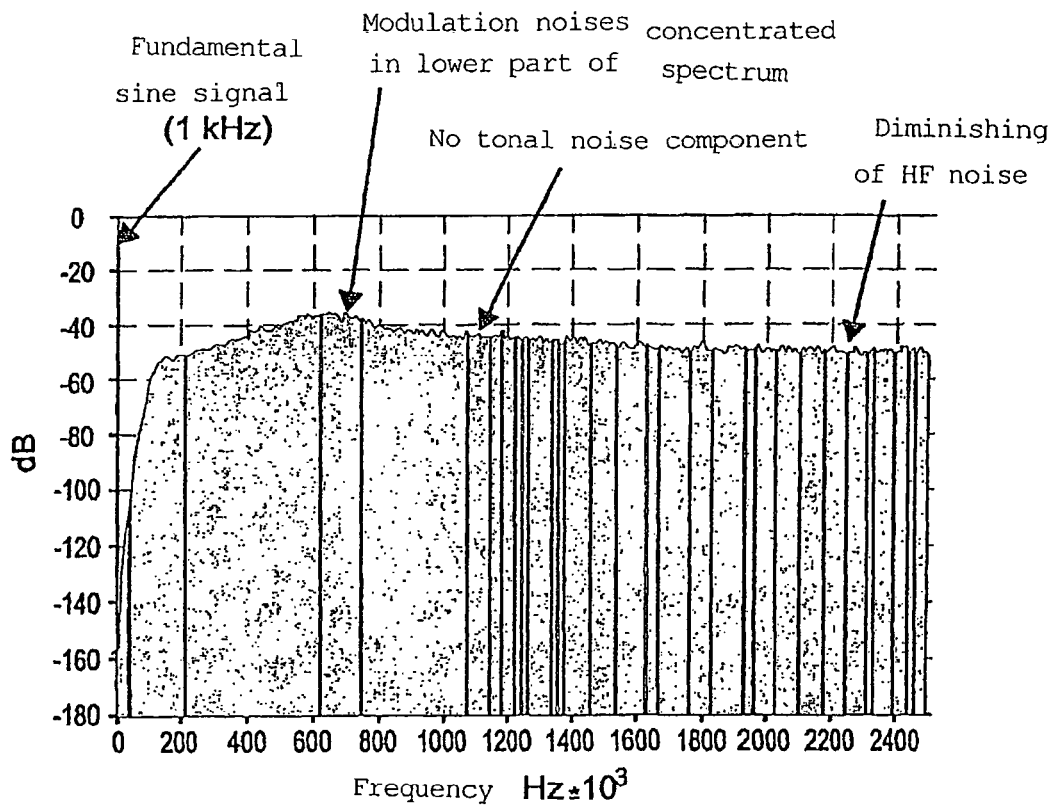
FIG. 8 shows a frequency spectrum resulting from the implementation of a vector lattice modulator conforming to the invention, according to a first embodiment.

FIG. 8 shows the frequency spectrum, ranging from 0 to 2.5 MHz, resulting from the preferred implementation according to the mode A of the MTV modulator 31 (FIGS. 5 and 6), designed in particular for a digital amplifier, this being the case when it is supplied with a simple, high-amplitude sine signal having a frequency of 1 kHz.

FIG. 8 clearly highlights the advantageous characteristics obtained by the method according to the invention, which have been recalled in the introduction to the present description, namely:

as compared with an implementation of a digital amplifier implementing a standard PWM-type modulation: the disappearance of high-frequency, high-energy tonal residues, diminished level of high-frequency residual noise. The absence of high-energy tonal residues improves the electromagnetic compatibility of the system.

as compared with the implementation of a digital amplifier implementing a standard PDM-type modulation of a digital amplifier: significant lowering of the general level of modulation noise, especially in the upper parts of the spectrum, concentration of the modulation noises in the lower part of the spectrum, in the region of 700 kHz in the example described.

the low-frequency concentration, in the region of 700 kHz, of the modulation noises: a hump is noted in the spectrum graph shown in FIG. 8. This characteristic implies that the mean switching frequency of the output stage of the amplifier is maintained at a reasonable level, thus enabling high efficiency for the system.

the maximum noise level is reduced relative to the two above-mentioned classic PWM and PDM modes of implementation of modulators.

It follows that the mode A embodiment truly attains the goals set by the invention.

A description shall not be given of the example of embodiment conforming to what has been arbitrarily called the mode B.

As indicated here above, the physical configuration of the modulator 31, in both modes, "A" and "B", remains identical. Reference shall therefore be made again to FIG. 6 which it is unnecessary to re-describe.

Similarly, the notations adopted to describe the modulation method and its steps remain the same and the same values will be preserved for N, K and T, namely 8, 2 and 3, respectively.

The five main steps, which are sequential or simultaneous, of the encoding method according to "mode B" of the invention are done iteratively as indicated here below. The letter "B" attached to the number of the step characterizes the "mode B".

Step 1B : Identical to the step 1A of the "mode A". It is therefore unnecessary to describe it again.

Step 2B : At the same time, using the pre-selection function PRESEL, Ref$_{12}$, the following are selected as possible developments for each of the N candidates: the two candidates whose outputs minimize the difference with the signal formed by the difference between the signals Hx(n), ref$_3$, and Hq(n), ref$_6$. These two candidates will be denoted by (a) and (b) respectively, (a) being the one that effectively minimizes the difference.

For each of the N candidates, the options (a) and (b) represent the K possible developments (K=2 in the example chosen). It must be noted that, in certain cases, the options (a) and (b) may be identical.

Step 3B: the difference between the input signal Hx(n), Ref$_3$, and the candidate signal Hq(n), Ref$_6$, is then passed on to the weighting function W or function known as a cost function, Ref$_7$. This cost function W is used to classify possible developments so that it is possible to choose the survivors from the next turn.

In this implementation (mode B), the cost function W is as follows: If the amplitude of the difference between the signals (Hx(n)–Hq(n)) is greater than a predetermined threshold, the option (b) cannot survive. If the amplitude of the above-mentioned difference (Hx(n)–Hq(n)) is below this threshold and if a counter (not shown) of a number of also predetermined transitions allows it, the option (a) cannot survive; if not, the option (b) cannot survive. The transition counter is of the "up-down" type, increasing its content by a value "1" whenever the option (b) is followed rather than the option (a) and the option (b) is greater than (a) and being diminished by "1 " whenever the option (b) is followed rather than the option (a) and the option (b) is smaller than (a). The transition counter enables a transition, i.e. the choice of the option (b) inasmuch as its absolute value is smaller than or equal to the number 2.

Step 4B: the result of the step 3B with the options that cannot survive being marked as such, i.e. the error signal e(n), Ref8, is passed on to the selection block SEL for the selection of the best candidate Ref9. This block will choose, as its best candidate, the candidate minimizing the number of transitions over a period (n–T, n) inasmuch as the energy of the error introduced by this candidate is limited relative to the energy of a natural candidate, i.e. formed only by options (a) for the candidates. f(n, k) designates the signal e(n) at the instant n for a candidate k and q(n,k) designates the signal y(n) at the time n for the same candidate. The block SEL will choose the candidate whose survival is permitted by the block of the function W and minimizes the number of transitions of the output stage over the period (n–T, n) and for which the following relationship is satisfied and limited relative to the same relationship computed for a natural candidate, i.e. formed only by options (a)

$$E(n,k)=(f(n-T,k)-q(n-T,k))\hat{2}+(f(n-T+1,k)-q(n-T,k))\hat{2}+ \ldots +(f(n,k)-q(n,k))\hat{2}$$

Step 5B: identical to the Step 5A of the "mode A". It is therefore unnecessary to describe it.

Similarly to the "mode A", it can be seen that the method consists of a search in a binary tree: at each step, there are two options of development (a) and (b) which have been defined here above, hence a sequence of dichotomic choices. Thus, a decision on an ideal candidate at the instant n determines one branch (a) of the tree, i.e. the branch containing the ideal candidate and, therefore, the survivors for the next turn, i.e. all the elements of the above-mentioned branch. In practice, the method according to the invention seeks to cause the candidate that minimizes the number of transitions of the output stage to be followed, inasmuch as the error introduced by this choice is of limited energy. Thus, it also leads to a reduction of the switching frequency of the output stage and, therefore, to an increase in the efficiency of the system. FIG. 7 may be referred to again to illustrate this mode of operation. It is therefore unnecessary to describe it again.

Figure 9:
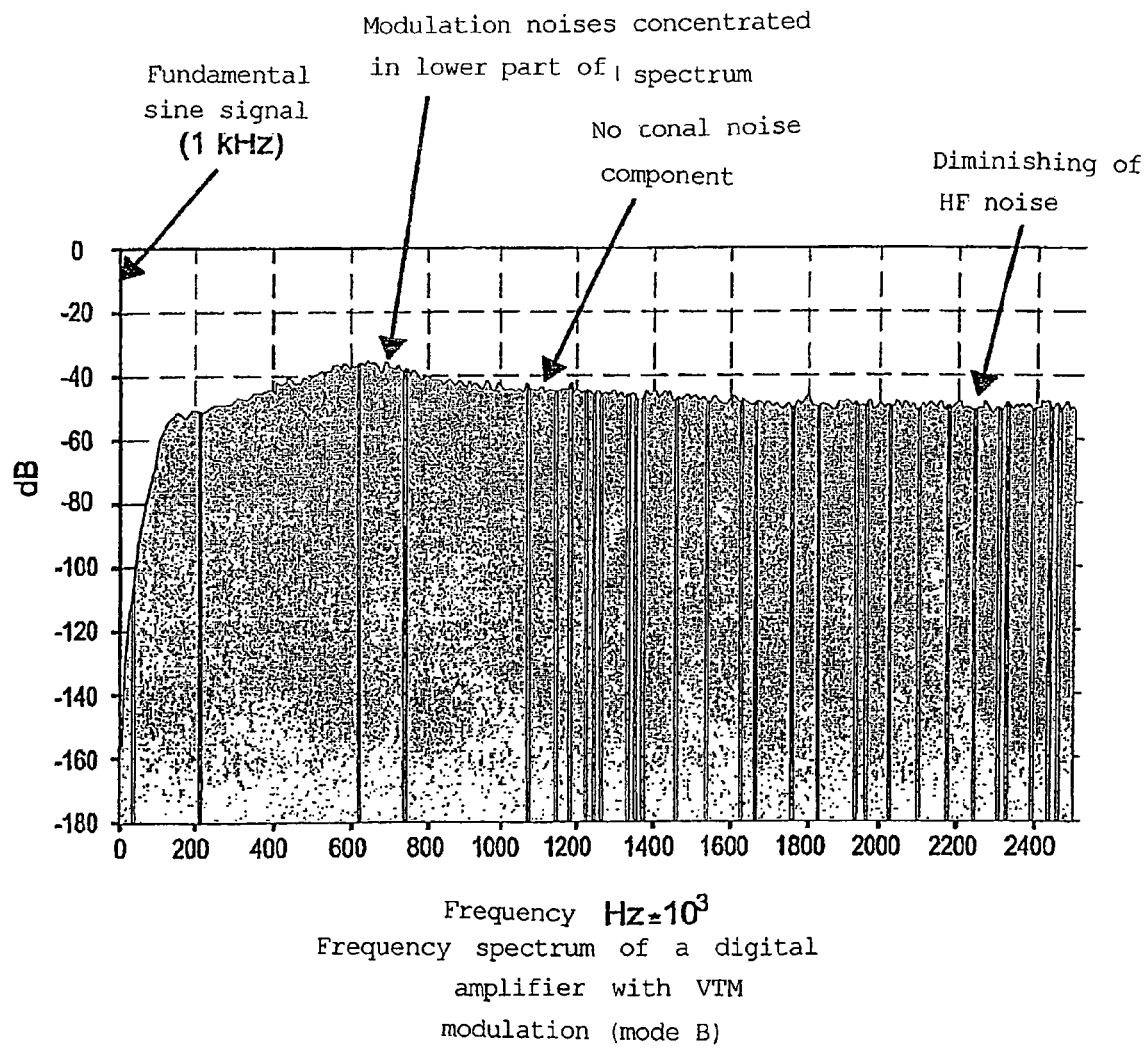
FIG. 9 shows a frequency spectrum resulting from the implementation of a vector lattice modulator conforming to the invention, according to a second embodiment.

FIG. 9 shows the frequency spectrum, ranging from 0 to 2.5 MHz, resulting from the preferred implementation according to the mode B of the MTV modulator 31 (FIGS. 5 and 6), designed in particular for a digital amplifier, this being the case when it is supplied with a simple, high-amplitude sine signal having a frequency of 1 kHz.

Once again, FIG. 8 clearly highlights the advantageous characteristics obtained by the method according to the invention. The only difference, which is minimal, is that the low frequency referred to here above is in the range of 600 kHz instead of 700 kHz, these values being due to a particular choice of parameters made to illustrate the method. It is therefore unnecessary to restate these advantages.

It follows therefrom that the mode B of the embodiment also achieves the goals set by the invention.

It must be clear however that the invention is not limited to the exemplary embodiment explicitly described, especially with reference to FIGS. 5 to 9.

Similarly, the numerical examples have been given only to provide a clear idea and cannot be deemed to constitute any limitation whatsoever of the scope of the invention. They proceed from a technological choice within the range of those skilled in the art.

Nor is the invention limited solely to the applications explicitly described.

As indicated, apart from the preferred embodiment of vector lattice modulators for audio signal digital amplifiers, the method of the invention can be profitably implemented in many fields, especially the following:

"PCM" to "DSD" conversion;

PWM type digital amplification: the invention enables the making of modulators for such amplifiers in considering, as output candidates, the pulse widths of the signal to be generated. It enables the making of symmetrical modulators as well as asymmetrical modulators with two or three levels (or even more if necessary).

PDM type digital amplification: since this problem is similar to the one raised by PCM to DSD conversion, the implementation for this type of application is immediate.

hybrid digital amplification: this new type of modulation may be likened to hybridization between the PDM and PWM approaches. It necessitates, for candidates, sequences of waveforms with a number of transition that is limited but not necessarily fixed (this is the case of the PWM type modulation).

step-by-step control of engines: since the control of engines is very close to amplification using PWM or hybrid type modulation, the implementation for this type of application is immediate.

TABLE I

| | |
|---|---|
| DSD | Direct Stream Digital: Encoding format used for SACD |
| MTV | Vector lattice modulation (Fr. Modulation en Treillis Vectoriel) |
| PCM | Pulse Code Modulation (or amplitude modulation) |
| PDM | Pulse Density Modulation |
| PWM | Pulse Width Modulation |
| SACD | Super Audio CD |
| SDM | Sigma Delta Modulator |
| DSP | Digital Signal Processor |
| FPGA | Field-Programmable Gate Arrays |
| SoC | System-on-Chip |
| FIR | Finite Impulse Response filter |
| IIR | Infinite Impulse Response filter |

The invention claimed is:

1. Method for the conversion of signals called input digital signals, comprising a phase for the modulation of said input signals; characterized in the said modulation is performed by the implementation of a vector lattice encoder and in that said method comprises the following encoding steps:

a preliminary step consisting of the choice of three parameters respectively representing a determined number N of distinct variables associated with said input signals, called output candidates, a determined number K of possible temporal developments of said candidates, and a temporal variable T, called historical decision depth, determining a maximum number of iterations before the generation of a result;

a first step for the filtering (Hx) of said input signals (x(n)) so as to generate first filtered signals;

a second step for the filtering (Hq) of signals representing candidates, so as to generate second filtered signals representing filtered candidates;

a third step in which the difference is taken between the said first and second filtered signals;

a fourth step consisting of the pre-selection, by means of a pre-selection element, for each of said N candidates, of the first to the Kth modified candidates representing said K possible developments and each meeting a first predetermined criterion, said first candidate (a) being the one that minimizes said difference;

a fifth step consisting of the weighting of said difference by means of function called a cost function classifying said K developments so as to mark the candidates designed to be eliminated or kept for a subsequent iteration of the steps of said method, and of the transmitting of said modified candidates to a selection element;

a sixth step consisting of the selection of the best candidate by said selection element by comparison with a second predetermined criterion minimizing said cost function (W);

a seventh step consisting of iterations from the first to sixth steps until said historical decision depth T is attained; and an eighth step consisting of choosing the best candidate at the end of said seventh step.

2. Method according to claim 1, characterized in that said number N of said output candidates is equal to 8, said determined number K of possible developments of said output candidates is equal to 2, and said historical decision depth T is equal to 3.

3. Method according to claim 1, characterized in that said filtering steps (Hx, Hq) consist of a low-pass filter made by means of a filter called a Chebychev II filter with optimized zeros.

4. Method according to claim 1, characterized in that it comprises an additional step performed before said encoding steps consisting of an over-sampling of said input signals, so as to raise the frequency of these signals.

5. Method according to claim 4, characterized in that the over-sampling factor is equal to 128.

6. Method according to claim 2, characterized in that, K being equal to 2, said pre-selection made during said fourth step consists of the selection, as possible developments, known as options, for each of said N candidates, of the first and second options (a, b) and in that, a first candidate, corresponding to the first option (a) is the one whose output signal (q(n)) minimizes said difference and a second candidate corresponding to the second option (b), is the one keeping the same output state as in the turn preceding the iteration.

7. Method according to claim 6, characterized in that said cost function carries out the following determining and computation operations during said fifth step:
   if said first (a) and second (b) options for a determined candidate have different signs and both are non-zero, then said second option (b) cannot survive;
   if the amplitude of said difference in signals is greater than a predetermined threshold, said second option (b) cannot survive;
   the counting of a number called a transition number by means of an up-down counter increasing its content by the one unit whenever said second option (b) is selected rather then said first option (a) and whenever said second option (b) is greater then said first option (a) and diminishing its content by one unit if the contrary is the case;
   if the amplitude of said difference is smaller then said threshold and said number of transitions counted is equal to a predetermined number, said first option (a) cannot survive and, if not, said second option (b) cannot survive;
   authorizing the selection of said second option (b) if and only if the absolute value of said content is smaller than or equal to the number 2;
   the marking of the candidates that cannot survive for a subsequent iteration.

8. Method according to claim 7, characterized in that the best candidate selected during said sixth step is the candidate minimizing the difference in energy between signals (Ref 8) delivered by said cost function (W) and an optimal output signal on a determined period of time.

9. Method according to claim 8, characterized in that, e(n) being said output signals delivered by said cost function (W), y(n)=q(n−T), said signal which is optimal over a period (n−T, n), with n representing an instantaneous temporal value, T said historical decision depth, f(n, k) said signal e(n) at the instant n for a candidate k and q(n,k) the signal y(n) at the time n for this same candidate, the selected candidate is the one whose survival is permitted for a subsequent iteration by said cost function (W) and for which the function E(n,k) is minimized, said function satisfying the following relationship:

$$E(n,k)=(f(n-T,k)-q(n-T,k))\hat{2}+(f(n-T+1,k)-q(n-T,k))\hat{2}+\ldots+(f(n,k)-q(n,k))\hat{2}.$$

10. Method according to claim 2, characterized in that, K being equal to 2, said pre-selection made during said fourth step consists of the selection, as possible developments, known as options, for each of said N candidates, of the first and second options (a, b), a first candidate, corresponding to the first option (a) whose output signal (q(n)) mninimizes said difference.

11. Method according to claim 10, characterized in that said cost function (W) carries out the following determining and computation operations during said fifth step:
   if the amplitude of said difference in signals is greater then a predetermined threshold, said second option (b) cannot survive;
   the counting of a number called a transition number by means of an up-down counter increasing its content by the one unit whenever said second option (b) is selected rather then said first option (a) and whenever said second option (b) is greater then said first option (a) and diminishing its content by one unit if the contrary is the case;
   if the amplitude of said difference is smaller then said threshold and said number of transitions counted is equal to a predetermined number, said first option (a) cannot survive and, if not, said second option (b) cannot survive;
   authorizing the selection of said second option (b) if and only if the absolute value of said content is smaller than or equal to the number 2;
   the marking of the candidates that cannot survive for a subsequent iteration.

12. Method according to claim 11, characterized in that said best candidate selected during said sixth step is the candidate minimizing the number of transitions over a predetermined period inasmuch as the energy of the error introduced by this candidate is limited relative to the energy of a candidate called a natural candidate which would be formed only by said first option (a).

13. Method according to claim 8, characterized in that, e(n) being said output signals delivered by said cost function (W),y(n)=q(n−T) said signal which is optimal over a period (n−T, n), with n representing an instantaneous temporal value, T said historical decision depth, f(n, k) said signal e(n) at the instant n for a candidate k and q(n,k) the signal y(n) at the time n for this same candidate, the selected candidate is the one whose survival is permitted for a subsequent iteration by said cost function (W) and for which the function E(n,k) is minimized, said function satisfying the following relationship and being limited relative to the same relationship computed for said natural candidate:

$$E(n,k)=(f(n-T,k)-q(n-T,k))\hat{2}+(f(n-T+1,k)-q(n-T,k))\hat{2}+\ldots+(f(n,k)-q(n,k))\hat{2}.$$

14. A device for the implementation of the method according to any one of the preceding claims, characterized in that it comprises, in cascade connection, a modulator comprising at least over-sampling circuits for the over-sampling of said input signals ($s_{30}$) and an encoder performing said lattice modulation.

15. A device according to claim 14, characterized in that said modulator is made on the basis of an automatic stored-program data-processing system, a specialized digital signal processor, a dedicated integrated circuit or a field-programmable integrated circuit.

16. Application of the method to claim 1 to the making of an audio signal digital amplifier said amplifier comprising, in cascade connection, a digital signal reception circuit, a modulation circuit comprising an over-sampler and an encoder performing said lattice modulation, a switching circuit converting said digital signals into analog signals delivered at its output and an output filter for the filtering of said analog signals.

17. Application according to claim 16, characterized in that said switching circuit has three logic switching circuits.

* * * * *